No. 895,436.   
PATENTED AUG. 11, 1908.
A. G. CRIPPS.
RELIEF VALVE FOR HOT WATER HEATING SYSTEMS.
APPLICATION FILED FEB. 20, 1908.
3 SHEETS—SHEET 1.
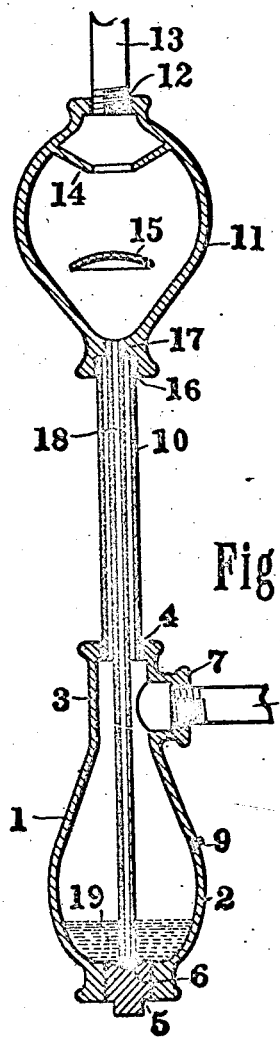
Fig. 1.
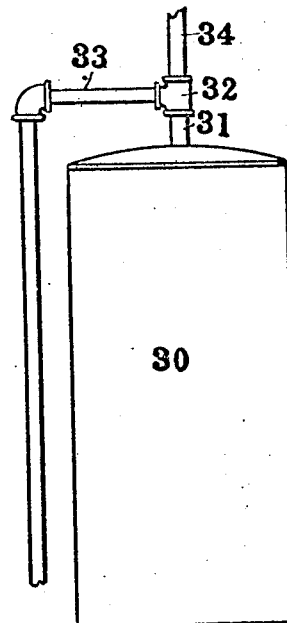
Fig. 2.
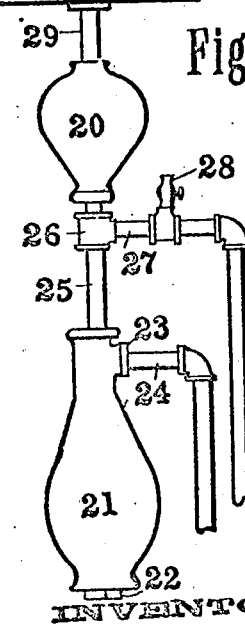
WITNESSES
Glenara Fox
Evelyn Blinn
INVENTOR
Alfred G. Cripps
BY C. E. Humphrey,
ATTORNEY.

No. 895,436. PATENTED AUG. 11, 1908.
A. G. CRIPPS.
RELIEF VALVE FOR HOT WATER HEATING SYSTEMS.
APPLICATION FILED FEB. 20, 1908.

3 SHEETS—SHEET 2.

WITNESSES
Glenara Fox
Evelyn Blinn

INVENTOR
Alfred G. Cripps
C. E. Humphrey
ATTORNEY

No. 895,436. PATENTED AUG. 11, 1908.
A. G. CRIPPS.
RELIEF VALVE FOR HOT WATER HEATING SYSTEMS.
APPLICATION FILED FEB. 20, 1903.

3 SHEETS—SHEET 3.

WITNESSES
Glenara Fox
Evelyn Blinn

INVENTOR
Alfred G. Cripps
C. E. Humphrey
BY
ATTORNEY.

UNITED STATES PATENT OFFICE.

ALFRED G. CRIPPS, OF AKRON, OHIO.

RELIEF-VALVE FOR HOT-WATER HEATING SYSTEMS.

No. 895,436.

Specification of Letters Patent.

Patented Aug. 11, 1908.

Application filed February 20, 1908. Serial No. 416,901.

*To all whom it may concern:*

Be it known that I, ALFRED G. CRIPPS, a citizen of the United States, residing at Akron, in the county of Summit and State of Ohio, have invented new and useful Improvements in Relief-Valves for Hot-Water Heating Systems, of which the following is a specification.

This invention relates to relief-valves used in connection with hot water heating systems.

The object of this invention is to produce a device of the class described designed to maintain a substantially constant pressure on the water in the system by opposing to its escape or expansion a mercury column.

The invention contemplates constructing a device with an expansion head to which is secured a bowl for a mercury bath, the interiors of the two being connected by a single tube through which the mercury must be forced for affording relief from pressure in the hot water system.

Other advantages constituting objects of this invention will more fully appear in the subjoined description.

Figure 3:
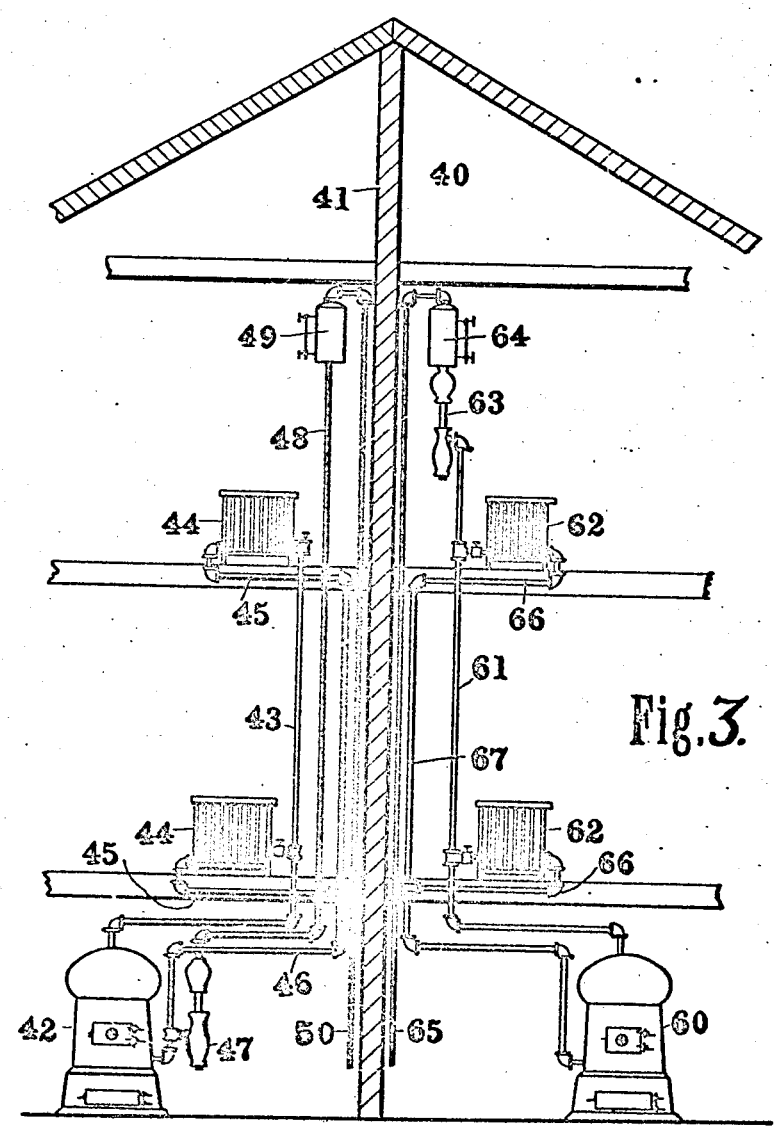
Figure 4:
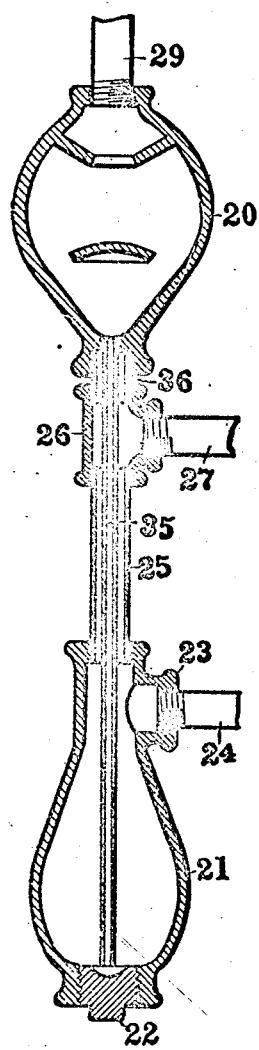

In the drawings, in which similar reference numerals indicate like parts in the different figures: Figure 1 is a view in vertical central section of my improved relief-valve with pipes for connecting it with a hot water system. Fig. 2 is a view in side elevation of a modification of the device shown in Fig. 1 in association with an expansion tank and pipe connections for communicating with the hot water system with which the same is used. Fig. 3 is a view in vertical section through a house showing two hot water heating systems with which my invention has been incorporated. This view is largely diagrammatic, as will appear, and Fig. 4 is a vertical, central, sectional view of a portion of the device shown in Fig. 2.

Referring to the drawings in detail, 1 is the bowl of my improved relief-valve having an enlarged lower portion 2 and a contracted portion 3 terminating in a top provided with an interiorly-threaded opening 4. The bottom of the bowl 1 is further provided with a threaded opening closed by means of a plug 5 having in its inner end a recess 6. The bowl 1 is further provided with a laterally-projecting boss 7 interiorly-threaded to receive the end of a pipe 8. The interior of the bowl is reached through the medium of an opening in the lower portion thereof, closed by a plug 9.

Secured in the threaded opening 4 of the bowl 1 is an upwardly-extending pipe 10 provided with a threaded upper end on which is mounted an expansion head 11 of substantially the general shape shown in the drawings and having in its lower end a threaded recess 16 to receive the pipe 10 and provided with an opening 12 to receive the threaded end of a pipe 13. The interior of the expansion head 11 is preferably provided with a plurality of baffles 14 and 15 for a purpose to be hereinafter described.

Extending from the interior of the expansion head downwardly and communicating with the recess 16 is a threaded opening 17 in which is secured a tube 18 the lower end of which terminates near the bottom of the bowl 1 and may project into the recess 6 of the plug 5. A quantity of mercury constituting a mercury bath 19 is constantly maintained in the bowl 1. The pipe 8 is supposed to lead from a boiler of the hot water system and the pipe 13 to extend to and communicate with an expansion tank positioned thereabove.

The operation of the device shown in Fig. 1 is as follows: Water from the boiler of the system is introduced to the interior of the bowl 1 through the medium of the pipe 8 and as soon as the pressure of the water in the bowl 1 becomes sufficiently great it will depress the mercury therein and cause it to ascend through the tube 18 until it eventually reaches the level of the expansion head. As soon as the mercury has reached the upper portions of the tube 18 a substantially constant pressure column will be maintained due to the relatively large volume of the head 11. From this arrangement it follows that the device operates to establish and maintain a substantially constant pressure in the system sufficient to support a mercury column and if the pressure in the water system continues to rise beyond the normal point, the mercury will pass upwardly into the expansion head 5 and if this operation is continued sufficiently the lower extremity of the tube 18 will become uncovered and will be reached by the water in the bowl 1 which will then pass upwardly through the tube 18 following the mercury into the expansion head 11. In this way, although a substantially constant pressure in the water system is maintained, relief is offered for excess water forced through the relief device by the increasing pressure. Of course if this escape of water into the expansion head continues for some time the head will become filled and the mercury level proportionately depressed. Eventually, if this compression continues, the water will pass up through the expansion pipe 13 of the expansion tank above and this water which enters the expansion tank will operate to assist the mercury to support the pressure obtaining in the system. At the same time, as the water is relatively very light as compared to the mercury a substantially normal pressure for the system will be thus obtained by the column of mercury normally supported. The baffles 14 and 15 are placed in the interior of the body of the expansion head to prevent the mercury forced upward by the action of the water from becoming thrown upwardly and out through the pipe 13 as well as to prevent too violent agitation thereof. As soon as the pressure of the water system becomes sufficiently reduced the weight of the mercury will overcome the pressure of the water and will return through the tube 18 to its original position in the bottom of the bowl 1 thereby constantly maintaining a column of mercury opposed to expansion or pressure in the system.

In the modification shown in Fig. 2 the relief-valve consists of the expansion head 20 constructed in the same manner as the expansion head 11 in Fig. 1, with a bowl 21 similar to the bowl 1. This bowl 21 has a plug 22 in its lower end and a boss 23 to receive a pipe 24.

The bowl 21 is provided at its upper end with a threaded opening in which is inserted a pipe 25 to the upper end of which is secured a "T" 26 from which extends upwardly a threaded pipe 36 secured in a recess in the lower end of the expansion head 20. A pipe 27 provided with a vent cock 28 extends laterally from the "T" 26.

Extending upwardly from the expansion head 20 is a pipe 29 connected with an expansion tank 30 from which rises a pipe 31 provided with a "T" 32 from which extends an overflow pipe 33 and a vent 34. The expansion head 20 and bowl 21 are connected by a tube 35 for receiving the mercury forced upward by the pressure of the system.

In the modification shown in Fig. 2 the pipe 27 leads from the boiler in the hot water system which connects through the pipe 25 with the interior of the bowl 21 and the return is made through the pipe 24 to the boiler. Any excess of pressure in the system will force the mercury in the bowl 21 upwardly into the expansion head 20 as has been described with reference to the device shown in Fig. 1 and from thence this water which follows the mercury will pass to the expansion tank 30 and from thence by the overflow 33.

The operation of the device shown in Fig. 2 is as follows: The vent 28 is first opened to permit water to rise to the level of the horizontal portion of the pipe 27 after which it is closed and the water in the boiler passes into the bowl 21 and returns by means of the pipe 24. If the pressure or excess of water increases sufficiently the mercury contained in the bowl 21 is forced upwardly into the expansion head 20 in the same manner as has been described with reference to the device shown in Fig. 1.

As the operation of my system depends primarily upon the height of the mercury column and not that of the water, it is immaterial whether the expansion tank employed be placed at a great elevation or not. It is also immaterial what is the position of the relief-valve with respect to the water system. It may be located in a basement or in the upper room of a dwelling as desired. In one aspect this relief device may be considered as a mercury seal affording means for supporting any pressure desired, through the displacement of which, water may escape into the expansion tank.

It will be stated that the relief device may be placed in any position with respect to the water system; that is, at any elevation with respect to the same, but of course it should be understood that when the device is in a depressed position with respect to the water system it will necessarily increase in length so as to support additional pressure arising from the weight of water due to the height of the same in the pipe system.

The presence of the recess 6 in the plug 5 is employed for the reason that the quantity of mercury around the lower mouth of the tube 18 will be longer maintained by reason of the fact that the mercury in the recess will be the last to be forced upwardly through the tube 18. This is desirable as it virtually increases the quantity of mercury available for the column.

In Fig. 3 the reference numeral 40 represents a building provided with a central partition wall 41 also showing two complete hot water systems one on each side of this wall, the difference between the systems being the difference in position of the relief valve with respect to the balance of the system.

In the system shown on the left of the partition wall 41, 42 is the hot water heater from which extends a riser 43 connected with which are radiators 44 having return pipes 45 communicating with a common return 46 and communicating with a bowl 47 of my improved relief-valve and also with the heater 42.

From the top of my relief-valve extends a pipe 48 on which is mounted an expansion pipe 49 provided with an overflow 50.

From the foregoing it will be seen that any undue pressure in the system will raise the mercury column in the relief-valve and the excess of pressure due to the water will escape to the expansion pipe 49 and from thence to the basement of the building.

In the system shown on the right side of the partition wall in Fig. 3, 60 represents the heater from which extends a riser 61 connecting with radiators 62 and terminating in open communication with the bowl of my improved relief-valve 63. Mounted above the relief-valve 63 is an expansion tank 64 provided with the usual overflow 65. The return flow from the radiators is taken care of by means of pipes 66 united into a common return 67.

What I claim and desire to secure by Letters Patent, is:—

1. A device of the class described comprising a bowl having a threaded opening in its upper end and containing a quantity of mercury, said bowl further provided with a lateral inlet pipe adapted to connect with the fluid circulating pipes of a heating system, a tubular member secured in the upper end of said bowl, an expansion head having a threaded recess in its lower portion to receive and form a fluid-tight joint with said tubular member comprising a supporting medium for said head, said head further provided with a second threaded opening extending from said recess to the interior of said head, and a single tube having a threaded upper end adapted to be mounted in and form a fluid-tight joint with said second threaded opening in said expansion head and extending downwardly through said tubular member and dipping in said mercury, substantially as described and for the purpose set forth.

2. A device of the class described comprising an expansion head provided with a threaded opening in its lower end, a single tube positioned in said opening and forming a fluid-tight joint therewith, said expansion head further provided with an interiorly-threaded recess surrounding said tube, a tubular member secured in said recess forming a fluid-tight joint therewith and inclosing said first mentioned tube, a bowl having a threaded opening in its upper end to receive said tubular member and into which said first threaded tube extends, said bowl containing a quantity of mercury provided with a lateral inlet pipe adapted to connect with the fluid circulating pipes of a heating system, substantially as described and for the purpose set forth.

In testimony whereof I have hereunto set my hand in presence of two subscribing witnesses.

ALFRED G. CRIPPS.

Witnesses:
  GLENARA FOX,
  C. E. HUMPHREY.